United States Patent
Kang et al.

(10) Patent No.: US 9,637,589 B2
(45) Date of Patent: May 2, 2017

(54) METHOD FOR CONTINUOUSLY PREPARING BIODEGRADABLE ALIPHATIC/AROMATIC POLYESTER COPOLYMER

(71) Applicants: LOTTE FINE CHEMICAL CO., LTD., Ulsan (KR); S-ENPOL CO., LTD., Wonju-si (KR)

(72) Inventors: Gyung Don Kang, Daejeon (KR); Ki Chull Yun, Cheonan-si (KR); Sang Yob Kim, Goyang-si (KR); Kil Seuk Byun, Yongin-si (KR); Jung Ryum, Seoul (KR); Boo Seong Kim, Seoul (KR); Sei Hoon Kim, Wonju-si (KR); Sung Bae Park, Incheon (KR)

(73) Assignees: LOTTE FINE CHEMICAL CO., LTD. (KR); S-ENPOL CO., LTD. (KR)

( * ) Notice: Subject to any disclaimer, the term of this patent is extended or adjusted under 35 U.S.C. 154(b) by 5 days.

(21) Appl. No.: 14/423,641

(22) PCT Filed: May 20, 2013

(86) PCT No.: PCT/KR2013/004389
§ 371 (c)(1),
(2) Date: Feb. 24, 2015

(87) PCT Pub. No.: WO2014/038774
PCT Pub. Date: Mar. 13, 2014

(65) Prior Publication Data
US 2015/0183927 A1    Jul. 2, 2015

(30) Foreign Application Priority Data
Sep. 4, 2012 (KR) .................. 10-2012-0097877

(51) Int. Cl.
*C08G 64/00* (2006.01)
*C08G 63/78* (2006.01)
*C08G 63/181* (2006.01)
*C08G 63/02* (2006.01)

(52) U.S. Cl.
CPC .......... *C08G 63/78* (2013.01); *C08G 63/181* (2013.01); *C08G 2230/00* (2013.01)

(58) Field of Classification Search
CPC .......................... C08G 63/00; C08G 67/00
USPC .............................................. 528/271, 272
See application file for complete search history.

(56) References Cited

U.S. PATENT DOCUMENTS

| 9,040,639 B2 | 5/2015 | Witt et al. |
| 9,334,359 B2 * | 5/2016 | Kang ................ C08G 63/20 |
| 2011/0039999 A1 | 2/2011 | Witt et al. |

FOREIGN PATENT DOCUMENTS

| CN | 101525425 A | 9/2009 |
| CN | 102443149 A | 5/2012 |
| CN | 102516517 A | 6/2012 |
| CN | 102558515 A | 7/2012 |
| DE | 11 2013 005 926 T5 | 9/2015 |
| EP | 1 106 640 A2 | 6/2001 |
| JP | 2011-516709 A | 5/2011 |
| KR | 1020000000780 | 1/2000 |
| KR | 1020000022207 | 4/2000 |
| KR | 1020030028444 | 4/2003 |
| KR | 100855683 | 8/2008 |
| KR | 100855683 * | 9/2008 ........ C08G 63/16 |
| KR | 1020110007185 | 1/2011 |
| KR | 1020110053830 | 5/2011 |
| WO | 2009127556 | 10/2009 |

OTHER PUBLICATIONS

Hado Co., Ltd., Copyright 2010 p. 1 of 1, http://www.hado.co.kr/default1.html.
Hitachi Infrastructure Systems, Hitachi, Ltd. 1994, 2015, p. 1 of 2, http://www.hitachi-pt.conn/products/ip/element_technology/simulation.html (cite re-directs to http://www.hitachi.com/businesses/infrastructure/index.html).
International Search Report—PCT/KR2013/004389 dated Aug. 21, 2013.
Written Opinion—PCT/KR2013/004389 dated Aug. 21, 2013.
European Patent Office Extended European Search Report dated Apr. 12, 2016 for corresponding European Patent Application No. 13834731.5 (7 pages).
Japanese Office Action dated Dec. 14, 2016 for Japanese Patent Application No. 2015-529654. (3 pages).

* cited by examiner

*Primary Examiner* — Terressa Boykin
(74) *Attorney, Agent, or Firm* — Fitch Even Tabin & Flannery LLP

(57) ABSTRACT

Provided is a method of continuous preparation of a biodegradable aliphatic/aromatic polyester copolymer, the method including: performing a first esterification reaction of an aliphatic dihydroxy compound and an aliphatic dicarboxylic acid at a temperature of 185° C. or less; continuously performing a second esterification reaction of a reaction product obtained by the first esterification reaction; obtaining a pre-polymer by continuously performing a first polycondensation reaction of a reaction product obtained by the second esterification reaction; and continuously performing polycondensation reaction of the pre-polymer, wherein an aromatic carboxylic acid is added to a reactor in which the first esterification reaction or the second esterification reaction is performed, to prepare the biodegradable aliphatic/aromatic polyester copolymer. According to the method of continuous preparation of the biodegradable aliphatic/aromatic polyester copolymer as described above, the amount of the aliphatic dihydroxy compound used, which is a starting material, is reduced and accordingly, manufacturing costs are reduced.

12 Claims, No Drawings

METHOD FOR CONTINUOUSLY PREPARING BIODEGRADABLE ALIPHATIC/AROMATIC POLYESTER COPOLYMER

TECHNICAL FIELD

The inventive concept relates to a method of continuously preparing a biodegradable aliphatic/aromatic polyester copolymer, and more particularly, to a method of continuously preparing a biodegradable aliphatic/aromatic polyester copolymer by using an aliphatic dicarboxylic acid and an aromatic dicarboxylic acid, and an aliphatic dihydroxy compound.

BACKGROUND ART

As conventional non-degradable plastics, such as nylon, polyethylene terephthalate, polypropylene, and polyethylene, are recognized as a primary cause of environmental pollutions, biodegradable polyesters are on the spotlight for environmental protection purposes and the like. The biodegradable polyesters may be prepared by a batch production method or a continuous production method.

In the batch production method, a relatively long residence time at a high temperature is needed to achieve an intrinsic viscosity and a molecular weight of a desired polyester; a partially heterogeneous reaction may occur even in a reactor; and properties of the polyester may be different at the initial, intermediate, and latter stages of a discharge process after the completion of the reaction. In this regard, when the biodegradable polyesters reside at a high temperature for a long period of time, the biodegradable polyesters may be hydrolyzed due to heat, which may affect mechanical strength and hydrolysis-resistant properties of the biodegradable polyesters and which may cause a quality difference due to the partially heterogeneous reactions and different discharge time.

On the contrary, the continuous production of the biodegradable polyesters has advantages of inhibiting hydrolysis of the biodegradable polyesters caused by heat that occurs in the batch production method, mass-producing the biodegradable polyesters, and continuously obtaining products with a uniform quality.

When preparing the biodegradable polyesters, diols such as 1,4-butanediol are generally used as aliphatic dihydroxy compounds.

However, there are many opportunities for improvements to the current use of 1,4-butanediol because 1,4-butanediol changes into tetrahydrofuran during a reaction, often causes problems in a vacuum line of a manufacturing device, and requires an excess quantity of 1,4-butanediol.

DETAILED DESCRIPTION OF THE INVENTIVE CONCEPT

Technical Problem

The inventive concept provides a method of continuously preparing a biodegradable aliphatic/aromatic polyester copolymer.

Technical Solution

According to an aspect of the inventive concept, there is provided a method of continuously preparing a biodegradable aliphatic/aromatic polyester copolymer, the method comprising: performing a first esterification reaction of an aliphatic dihydroxy compound with an aliphatic dicarboxylic acid at a temperature of 185° or less; continuously performing a second esterification reaction of a reaction product obtained from the first esterification reaction; obtaining a prepolymer by continuously performing a first polycondensation reaction of a reaction product obtained from the second esterification reaction; and continuously performing polycondensation reaction of the prepolymer, wherein an aromatic carboxylic acid may be added to the step of performing the first esterification reaction or the step of continuously performing the second esterification reaction, to prepare the biodegradable aliphatic/aromatic polyester copolymer.

Advantageous Effects

When the method of continuously preparing a biodegradable aliphatic/aromatic polyester copolymer according to the inventive concept is used, an amount of the aliphatic dihydroxy compound, which is a starting material, is decreased, thereby reducing manufacturing cost thereof.

BEST MODE

A method of continuously preparing a biodegradable aliphatic/aromatic polyester copolymer according to the inventive concept includes: performing a first esterification reaction of an aliphatic dihydroxy compound with an aliphatic dicarboxylic acid at a temperature of 185° C. or less; continuously performing a second esterification reaction of a reaction product obtained from the first esterification reaction; obtaining a prepolymer by continuously performing a first polycondensation reaction of a reaction product obtained from the second esterification reaction; and continuously performing polycondensation reaction of the prepolymer, wherein an aromatic carboxylic acid may be added to the step of performing the first esterification reaction or the step of continuously performing the second esterification reaction.

The term "esterification reaction" used herein refers to not only the esterification reaction of the dihydroxy compound with the dicarboxylic acid, but also a trans-esterification reaction thereof.

As described above, the esterification reaction may include the first esterification reaction to obtain an aliphatic oligomer by performing the reaction at a temperature of 185° or less, and the second esterification reaction to obtain an aliphatic/aromatic oligomer by performing the reaction at a temperature in the range of about 220 to about 250°.

The first esterification reaction of the aliphatic dihydroxy compound with the aliphatic dicarboxylic acid is performed at a temperature of 185° or less to effectively inhibit a side reaction, in which the aliphatic dihydroxylic compound such as 1,4-butanediol, which is a starting material, is converted into tetrahydrofuran (THF).

The conversion of 1,4-butanediol to THF strongly occurs at a temperature of about 190° or higher under acidic conditions. Based on the consideration of the conversion, a reaction temperature of the first esterification reaction is adjusted to 185° or less to inhibit and minimize the conversion of the 1,4-butanediol into the THF as much as possible. Thus, the amount of 1,4-butanediol required for preparing the biodegradable aliphatic/aromatic polyester copolymer is significantly reduced compared to the conventional method, and accordingly manufacturing costs of the biodegradable polyester are reduced.

Also, the inventive concept is suitable for environmental protection purposes because occurrence of the byproduct such as THF is inhibited, thereby reducing occurrence of problems in a vacuum line of a manufacturing device due to the byproduct. Thus, workability is improved, and accordingly manufacturing efficiency is enhanced.

The reaction temperature of the first esterification reaction may be, for example, in the range of about 160 to about 185°, and particularly, may be about 180°.

The first esterification reaction may be performed in a batch reactor. Also, the first esterification reaction may be continuously performed by providing a mixture of the aliphatic dihydroxy compound and the aliphatic dicarboxylic acid to the first esterification reactor.

In order to catalyze the first esterification reaction of the aliphatic dihydroxy compound with the aliphatic dicarboxylic acid, a catalyst may be added to the mixture of the aliphatic dihydroxy compound and the aliphatic dicarboxylic acid.

The second esterification reaction, which is esterification reaction of the aromatic dicarboxylic acid and the aliphatic oligomer obtained from the first esterification reaction, may be performed at a temperature in the range of about 220 to about 250° that is higher than the temperature of the first esterification reaction, to obtain a target product.

Examples of the aliphatic dihydroxy compound may include $C_2$-$C_{30}$ alkanediol, such as ethanediol, 1,2-propanediol, 1,3-propanediol, 1,2-butanediol, 1,4-butanediol, 1,5-pentanediol, 1,6-hexanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, or a mixture thereof.

Examples of the aliphatic dicarboxylic acid may include a $C_2$-$C_{30}$ aliphatic acid, for example, a $C_4$-$C_{14}$ aliphatic acid and derivatives thereof, which may be a linear or a branched acid.

An example of the aliphatic dicarboxylic acid may be a $C_7$-$C_{30}$ cycloaliphatic dicarboxylic acid.

Examples of the aliphatic dicarboxylic acid may include malonic acid, succinic acid, glutaric acid, 2-methylglutaric acid, 3-methylglutaric acid, adipic acid, pimellic acid, suberic acid, azelaic acid, sebacic acid, undecanedioic acid, dodecanedioic acid, brassylic acid, tetradecanedioic acid, furmaric acid, 2,2-dimethylglutaric acid, maleic acid, itaconic acid, or a mixture thereof.

Examples of the aromatic dicarboxylic acid may include a $C_8$-$C_{30}$ aromatic dicarboxylic acid, such as terephthalic acid, isophthalic acid, 2,6-naphthoic acid, 1,5-naphthoic acid, or a mixture thereof.

A total amount of the aliphatic dihydroxy compound used in the first esterification reaction and second esterification reaction may be in a range of about 1.1 to about 1.5 moles based on 1 mole of a total sum of the aliphatic dicarboxylic acid and the aromatic dicarboxylic acid. Thus a production yield of the oligomer is excellent even when a small amount of the aliphatic dihydroxy compound is used compared to the conventional method in which an amount of the aliphatic dihydroxy compound used is 2 moles or more based on 1 mole of a total sum of the aliphatic dicarboxylic acid and the aromatic dicarboxylic acid.

In the first esterification reaction, an amount of the aliphatic dicarboxylic acid used may be in the range of about 40 mol % to about 99 mol % based on a total mole of the dicarboxylic acid used.

An amount of the aromatic dicarboxylic acid used may be in the range of about 1 mol % to about 60 mol % based on a total mole of the dicarboxylic acid used. Here, the total amount of the aliphatic dicarboxylic acid and the aromatic dicarboxylic acid is set to be 100 mol %. In the mixture of the aliphatic dihydroxy compound and the aliphatic dicarboxylic acid, at least one selected from a catalyst, a heat stabilizer, a branching agent, a color stabilizing agent, and a color control agent may be further added thereto.

An example of the catalyst may include a metal-containing compound including at least one selected from a group consisting of lithium, magnesium, calcium, barium, cerium, titanium, zirconium, hafnium, vanadium, manganese, iron, cobalt, iridium, nickel, zinc, and tin.

Examples of the metal-containing compound may include a metal organic acid salt, a metal alkoxide, a metal complex, a metal oxide, a metal hydroxide, a metal carbonate, a metal phosphate, a metal sulfate, a metal nitrate, or a metal chloride.

An example of the catalyst may be tetra-n-butyl titanate or tetra-n-isopropyl titanate.

The catalyst may be used in an amount in the range of about 0.00001 to about 0.2 moles based on 1 mole of the dicarboxylic acid. When an amount of the catalyst used is within the ranges above, the production yield of the product of the first esterification reaction is excellent. When the amount of the catalyst used is less than about 0.00001 mole, a reaction time may be slowed down. On the contrary, when the amount of the catalyst used is more than about 0.2 mole, a rate of depolymerization may be accelerated in the end of polycondensation reaction, and thus a desired degree of polymerization may not be obtained, tensile strength/internal tearing strength may be lowered, or chromaticity may be degraded.

As the branching agent, a compound having a three or more ester formable group selected from a carboxyl group, a hydroxyl group, and an amine group may be used. Examples of the branching agent may include trimellitic acid, citric acid, maleic acid, glycerol, monosaccharide, disaccharide, dextrin, or a reduced sugar.

When the branching agent is used, the biodegradable polyester copolymer of a high molecular weight may be easily prepared, but due to wide distribution of the molecular weight, the tensile strength/internal tearing strength may be decreased. Thus, the amount of the branching agent to be used needs to be controlled appropriately.

The amount of the branching agent may be used in the range of about 0.00001 to about 0.2 mole based on 1 mole of a total of the dicarboxylic acid used. When the branching agent is used within the ranges above, the biodegradable aliphatic/aromatic polyester copolymer of the high molecular weight with excellent tensile strength/internal tearing strength may be obtained.

Examples of the color stabilizing agent may include phosphoric acid, phosphorous acid, triphenylphosphonate, triphenylphosphate, trimethyl phosphate, sodium hypophosphite, or sodium phosphonate. Here, an amount of the color stabilizing agent used may be in a range of 0.00001 to 0.2 mole based on 1 mole of a total of the dicarboxylic acid.

An example of the color control agent may be cobalt acetate.

The first polycondensation reaction (referred to as a pre-polycondensation) of a reaction product, which is obtained from the second esterification reaction, is continuously performed to obtain a prepolymer.

The catalyst may be further added to the reaction mixture to catalyze the first polycondensation reaction. In some embodiments, at least one selected from the catalyst and the stabilizer may be further added to the reaction mixture.

The step of continuously performing polycondensation reaction of the prepolymer obtained from the first polycondensation reaction may be performed in multi-steps. For example, the multi-steps may include the step of continuously performing the second polycondensation reaction of the prepolymer and the step of continuously performing the third polycondensation of the product obtained from the second polycondensation reaction.

In regard to the method of the inventive concept, even when a chain extender is not used or a small amount of the chain extender is used, a desired biodegradable aliphatic/aromatic polyester copolymer of high molecular weight may be prepared.

The biodegradable aliphatic/aromatic polyester copolymer of the inventive concept may include a first repeat unit represented by Formula 1 and a second repeat unit represented by Formula 2. A weight average molecular weight of the copolymer may be in a range of about 80,000 to about 300,000, and for example, in a range of about 110,000 to about 170,000.

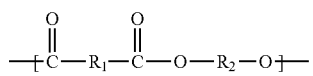

[Formula 1]

In Formula 1, $R_1$ and $R_2$ are each independently a divalent $C_1$-$C_{30}$ aliphatic hydrocarbon group.

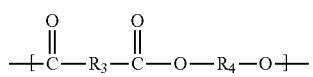

[Formula 2]

In Formula 2, $R_3$ is a divalent $C_6$-$C_{30}$ aromatic hydrocarbon group, and $R_4$ is a divalent $C_1$-$C_{30}$ aliphatic hydrocarbon group.

The copolymer may be an alternating copolymer, a random copolymer, or a block copolymer.

In Formula 1, $R_1$ and $R_2$ may be each independently ethylene, propylene, or butylene. In Formula 2, $R_3$ may be a phenylene group, and $R_4$ may be ethylene, propylene, or butylene.

The aliphatic/aromatic polyester copolymer may be a polymer having a first repeat unit represented by Formula 3 and a second repeat unit represented by Formula 4.

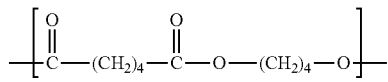

[Formula 3]

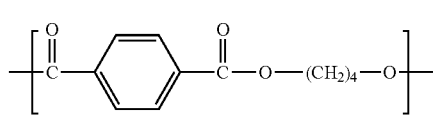

[Formula 4]

A molar ratio of the first repeat unit and the second repeat unit may be controlled by varying the amount of the aliphatic dicarboxylic acid used and the amount of the aromatic dicarboxylic acid used that react with the aliphatic dihydroxy compound in the above-described method.

The molar ratio of the first repeat unit and the second repeat unit may be in the range of 40:60 to 99:1

In Formulas 1 and 2, the aliphatic hydrocarbon may be a $C_1$-$C_{30}$ alkylene group, a $C_5$-$C_{30}$ cycloalkylene group, or a $C_4$-$C_{30}$ cycloheteroalkylene group.

In Formula 2, the aromatic hydrocarbon may be a $C_6$-$C_{30}$ arylene group or a $C_5$-$C_{30}$ heteroarylene group.

The method of preparing the biodegradable aliphatic/aromatic polyester copolymer according to an embodiment will now be described in more detail. In the method, the first esterification reaction is continuously performed in an esterification reactor.

First, an aliphatic dihydroxy compound and an aliphatic dicarboxylic acid are mixed in a first slurry tank to prepare a slurry.

A catalyst may be further added to the slurry.

[First Continuous Esterification Reaction]

The slurry obtained from the first slurry tank is continuously added to a first esterification reactor to perform esterification reaction of the aliphatic dihydroxy compound and the aliphatic dicarboxylic acid, at a temperature of 185° or less, for example, a temperature in the range of about 160 to about 185°. Here, a flow rate of the slurry, which is to be added to the first esterification reactor, may be adjusted according to a size of the reactor to control a residence time of a reaction mixture in the reactor, but the flow rate is not limited to a specific range. For example, when a volume of the first esterification reactor is about 0.49 m³, the flow rate of the slurry may be in a range of about 20 to about 40 kg/h.

The catalyst may be further added to the first esterification reactor.

The pressure in the first esterification reactor may be controlled in a normal pressure range, and the term "normal pressure" used herein is in a range of about 760±10 torr.

The heat stabilizer may be further added to the reaction mixture.

A level (which is a charging quantity in the reactor) and flow rate of the reaction mixture may be adjusted so that the residence time thereof in the first esterfication reactor is 2 to 6 hours.

By-product water generated by the esterification reaction is removed through a condenser.

An acid value of the aliphatic oligomer obtained from the first esterification reaction may be less than 1 mg KOH/g or less, and for example, may be in a range of about 0.1 to about 1 mg KOH/g, and the weight average molecular weight of the aliphatic oligomer may be in a range of about 300 to about 1,000.

The reaction mixture in the first esterification reactor is continuously added to a second slurry tank at a flowrate in a range of about 20 to about 40 kg/h. Also, the aromatic dicarboxylic acid is added to the second slurry tank and then stirred.

As a reactor for the first esterification reaction, a reactor suitable for manufacturing an ester oligomer having a molecular weight in the ranges above, and flow properties such as a viscosity and a melt index corresponding to the molecular weight, may be used, and the reactor is widely known in the field of polyester polymer synthesis to which the inventive concept belongs. For example, a vertical-type reactor equipped with a stirrer having pitched paddle impellers (manufactured by Hado, Korea) may be used. The stirrer may form a resultant flow of a under flow and an axial flow to make an ideal flow pattern of which a stirring effect is high (refer to http://www.hado.co.kr/default1.html).

[Second (Continuous) Esterification Reaction]

The slurry in the second slurry tank is continuously added to a second esterification reactor to perform a second esterification reaction of the aliphatic oligomer and the terephthalic acid, at a temperature in a range of about 220 to about 250° C. Here, the pressure is normal, and in the case of the second esterification reactor with a volume of about 0.4 m$^3$, the flow rate is in the range of about 30 to about 45 kg/h.

Water generated by the ester reaction is removed through a condenser.

To compensate for 1,4-butanediol (BDO) that is converted to tetrahydrofuran (THF) or distilled at a high temperature and then lost, the aliphatic dihydroxy compound such as pure BDO may be further continuously added to the second esterification reactor through a separate injection device at a flow rate in a range of about 0.1 to about 8 kg/h to perform a reaction.

The residence time of the reaction mixture in the second esterification reactor may be set to be in the range of about 2 to about 6 hours by controlling the level and the flowrate of the reaction mixture.

In the above-described method, the amount of THF that is removed through the condenser is reduced, and thus the amount of the pure BDO used, which is injected through the injection device, is significantly reduced compared to the conventional method.

The acid value of the product resulting from the second esterification reaction may be in a range of about 10 to about 40 mg KOH/g, and the weight average molecular weight of the product may be in a range of about 1,000 to about 5,000.

As a reactor for the second esterification, a reactor suitable for manufacturing an ester oligomer having a molecular weight in the ranges above, and flow properties such as a viscosity and a melt index corresponding to the molecular weight, may be used, and the reactor is widely known in the field of polyester polymer synthesis to which the inventive concept belongs. For example, a reactor of the same type as that used in the first esterification reaction may be used.

[First Polycondensation Reaction]

The product obtained from the second esterification reaction may be continuously added into the first polycondensation reactor, and then a first polycondensation (that is, pre-polymerization) of the product is performed to obtain a prepolymer. Here, a reaction temperature may be in a range of about 220 to about 250° C., and a degree of vacuum may be in a range of about 10 to about 50 torr.

At least one selected from a catalyst and a heat stabilizer may be further added to the reactor to catalyze the reaction.

A level (which is a charging quantity in the reactor) and flow rate of a reaction mixture may be adjusted so that the residence time of the reaction mixture in the first polycondensation reactor is 1 to 4 hours.

The acid value of the prepolymer, which is the product of the first polycondensation reaction, may be in a range of about 5 to about 10 mg KOH/g, and the weight average molecular weight of the prepolymer may be in the range of about 6,900 to about 14,000.

As a reactor for the first polycondensation reaction, a reactor suitable for manufacturing a prepolymer having a molecular weight in the ranges above and a viscosity corresponding to the molecular weight, may be used, and the reactor is widely known in the field of polyester polymer synthesis to which the inventive concept belongs. For example, a vertical-type reactor (manufactured by Hitachi Plant Technology) equipped with an anchor-type stirrer may be used. Here, in the case of the first polycondensation reactor with the volume of about 0.4 m$^3$, the flow rate may be in the range of about 20 to about 50 kg/h.

[Second Polycondensation Reaction]

The prepolymer obtained from the first polycondensation reaction is continuously added into the second polycondensation reactor, and then a second polycondensation reaction of the prepolymer is performed at a temperature of about 220 to about 250° C. Here, the degree of vacuum may be in the range of about 2 to about 7 torr, and the residence time of the reaction mixture may be set to be in the range of about 1 to about 4 hours by controlling the level (which is a charging quantity in the reactor) and the flow rate of the reaction mixture.

The acid value of the product obtained from the second polycondensation reaction may be in a range of about 3 to 8 mg KOH/g, the weight average molecular weight of the product may be in a range of about 60,000 to about 110,000, and the melt index of the product may be in a range of about 10 to about 50.

As a reactor for the second polycondensation reaction, a reactor suitable for manufacturing a prepolymer having a molecular weight in the ranges above, and flow properties such as a viscosity and a melt index corresponding to the molecular weight, may be used, and the reactor is widely known in the field of polyester polymer synthesis to which the inventive concept belongs. For example, a horizontal-type reactor (manufactured by Hitachi Plant Technology) equipped with a single stirrer that is horizontally arranged may be used. Here, in the case of the second polycondensation horizontal-type reactor with the volume of about 0.24 m$^3$, the flowrate may be in a range of about 20 to about 40 kg/h, and the number of revolutions of the stirrer may be in a range of about 1.5 to about 8 rpm.

[Third Polycondensation Reaction]

The product obtained from the second polycondensation reaction is continuously added into the third polycondensation reactor, and then a third polycondensation reaction may be performed at a temperature of about 220 to about 250° C. Here, the degree of vacuum may be in the range of about 0.5 to about 2 torr.

A level (which is a charging quantity in the reactor) and the flow rate of the reaction mixture may be adjusted so that the residence time of the reaction mixture in the third polycondensation reactor is 1 to 3 hours.

A final polymer whose reaction is completed may be passed through a cooling water bath to be cooled and solidified, cut into a desired form by using a cutter, dried, and transferred to a silo to charge the silo to prepare a desired biodegradable aliphatic polyester.

The acid value of the polyester copolymer is in the range of about 1.5 to about 6 mg KOH/g, the weight average molecular weight of the polyester copolymer is in the range of about 80,000 to about 300,000, for example in the range of about 110,000 to about 170,000, the intrinsic viscosity of the polyester copolymer is in the range of about 120 to about 200 cm$^3$/g, and the melt index of the polyester copolymer is in the range of about 1 to about 5.

As a reactor for the third polycondensation reaction, a reactor suitable for manufacturing a prepolymer having a molecular weight in the ranges above, and flow properties such as a viscosity and a melt index corresponding to the molecular weight, may be used, and the reactor is widely known in the field of polyester polymer synthesis to which the inventive concept belongs. For example, a horizontal-type polycondensation reactor (manufactured by Hitachi Plant Technology) equipped with two stirrers that are horizontally arranged may be used. More specifically, the third horizontal-type polycondensation reactor of the Hitachi Plant Technology has two spectacle-shaped blades that are arranged horizontally parallel to each other. Here, a blade connected to each rotation axis passes through between the blade and another blade of another rotation axis to widen a surface area of high viscosity reaction mixture and induce an efficient reaction (refer to http://www.hitachi-pt.com/products/ip/element_technology/simulation.html).

Here, in case of the third polycondensation reactor with a volume of about 0.192 m$^3$, the flow rate may be in a range of about 20 to about 40 kg/h, and the number of revolutions of the stirrer may be in a range of about 5 to about 8 rpm.

During the first, second, and third polycondensation reactions, a color stabilizing agent may be further added to each of the reactors used in the polycondensation reactions.

Examples of the color stabilizing agent may be phosphoric acid, phosphorous acid, triphenyl phosphonate, triphenyl phosphate, sodium hypophosphite, and sodium phosphonate.

Hereinafter, a method of manufacturing a biodegradable aliphatic/aromatic polyester copolymer according to another embodiment will now be described in more detail.

According to another embodiment, a first esterification reaction is performed in a batch reactor, which is a different from the above-described method. This method will be described in detail below.

In the batch reactor, esterification reaction of the aliphatic dihydroxy compound and the aliphatic dicarboxylic acid is performed at a temperature of 185° C. or less to obtain an aliphatic oligomer.

The esterification reaction may be performed in the presence of a catalyst.

Water generated by the esterification reaction is removed through a condenser, and a heat stabilizer may be further added to the batch reactor.

The aliphatic oligomer may be stored in a storage tank.

The aliphatic oligomer in the storage tank and the aromatic dicarboxylic acid are supplied to a first slurry tank. Here, the aromatic dicarboxylic acid is quantified in a hopper and input into the first slurry tank. Here, while the internal temperature of the first slurry tank is maintained in a range from about 70 to about 80° C., the aliphatic oligomer is stirred.

In some other embodiments, the aromatic dicarboxylic acid is not supplied to the first slurry tank. Instead, the aromatic dicarboxylic acid may be added to the reactor in which the esterification reaction of the aliphatic dihydroxy compound and aliphatic dicarboxylic acid is performed.

The slurry manufactured in the first slurry tank is continuously flowed to the second slurry tank. The second slurry tank is intended to give continuity by introducing the slurry to the second esterification reactor at a stable flowrate, and the internal temperature of the second slurry tank is maintained in a range from about 70 to about 80° C.

While the slurry manufactured in the second slurry tank is continuously input to the second esterification reactor, the second esterification reaction of the aliphatic oligomer and the aromatic dicarboxylic acid is performed. A description of the subsequent reactions, which are the same as the above-described methods according to the embodiment, will be omitted here.

The biodegradable aliphatic/aromatic polyester copolymer according to an embodiment is useful as a film, a sheet, a fiber, or other molded material.

Mode of the Inventive Concept

Hereinafter, the inventive concept will be described more specifically with reference to the following examples, but are not intended to limit the scope of the inventive concept.

Test Method

First, the acid value and the weight average molecular weight of the reaction products, which are obtained in each step of Examples 1 to 5 below, are evaluated as follows:

(1) Acid Value

The acid value was measured according to DIN EN 12634, and the solvent was a mixture of 10 parts by volume of N,N-dimethylsulfoxide, 8 parts by volume of propane-2-ol, and 7 parts by volume of toluene.

A sample was heated to a temperature of 50° C., a single-rod electrode was used in a circuit, and a container containing the sample was filled with potassium chloride. A standard solution used herein was tetramethyl ammonium hydroxide (TMAH).

(2) Weight Average Molecular Weight

The weight average molecular weight was measured by gel permeation chromatography (GPC, manufactured by Agilent HP 1100), and polystyrene was used as a standard material. A column was prepared by continuously connecting a PLgel (5 um) Mixed-D (manufactured by Phenomenex Company) and a PLgel (10 um) Mixed-B. The measurement was performed under conditions in which a temperature of the column and the detector was 35° C. and the flow rate was 1 ml/min.

Example 1: Preparation of Biodegradable Poly(Butylene Adipate-Co-Terephthalate) (PBAT)

[First Slurry Tank]

1,4-butanediol and adipic acid were added at a molar ratio of 1.3:0.52 to the first slurry tank, stirred at a temperature of 70 t, and mixed to prepare a slurry.

[First Esterification Reaction]

The slurry from the first slurry tank was continuously added to the first esterification reactor to perform the first esterification reaction of 1,4-butanediol and adipic acid. Here, the flow rate was about 35 kg/h, the reaction temperature was 180° C., and the pressure was normal.

As a reactor for the first esterification reaction, a vertical-type reactor equipped with a stirrer having pitched paddle impellers (manufactured by Hado, Ltd., Korea) was used (refer to http://www.hado.co.kr/default1.html). Triphenyl phosphate and tetra-n-butyl titanate were added to the reaction mixture of the first esterification reactor.

The triphenyl phosphate and the tetra-n-butyl titanate were each pre-mixed with the 1,4-butanediol to a concentration of 10% by weight and were continuously added to the reactor. The flowrate was controlled so that an amount of the triphenyl phosphate used was 0.1 g ($3.06 \times 10^{-4}$ mol) per 0.52 mols of the adipic acid and an amount of the tetra-n-butyl titanate used was 0.3 g ($8.815 \times 10^{-4}$ mol) per 0.52 mols of the adipic acid.

Water produced by the esterification reaction was removed through the condenser.

A level (which is a charging quantity in the reactor) of the reaction mixture was adjusted so that the residence time of the reaction mixture in the reactor was 3 hours.

The acid value of the reaction product was about 1 mg KOH/g, and the weight average molecular weight was 800.

[Second Slurry Tank]

The reaction mixture from the first esterification reactor was continuously added to the second slurry tank at a flow rate of about 30 kg/h. Here, terephthalic acid was added thereto and mixed by stirring. The final molar ratio of the 1,4-butanediol, the adipic acid, and the terephthalic acid was adjusted so as to be 1.3:0.52:0.48 in the reaction mixture.

[Second Esterification Reaction]

The slurry from the second slurry tank was continuously added to the second esterification reactor to perform the second esterification reaction of the aliphatic oligomer which is the product of the first esterification reaction and terephthalic acid. Here, the flow rate was 40 kg/h, the reaction temperature was 230° C., and the pressure was normal.

As a reactor for the second esterification reaction, the same reactor as used in the first esterification reaction was used.

Water produced by the second esterification reaction was removed through the condenser, and the pure 1,4-butanediol was continuously added to the reactor at the flow rate of 2 kg/h to be reacted. A level (which is a charging quantity in the reactor) of the reaction mixture was adjusted so that the residence time of the reaction mixture was 3.5 hours.

The acid value of the reaction product was about 20 mg KOH/g, and the weight average molecular weight was about 2,000.

[First Polycondensation Reaction]

The product obtained by the second esterification reaction was continuously added to the first polycondensation reactor to perform the first polycondensation (referred to as pre-polymerization) thereof so as to obtain a pre-polymer. Here, the flow rate was 35 kg/h, the reaction temperature was 240° C., and the degree of vacuum was 20 torr.

As the first polycondensation reactor, the vertical-type reactor (manufactured by Hitachi Plant Technology) equipped with the anchor-type stirrer was used.

Tetra-n-butyl titanate as a catalyst was pre-mixed with 1,4-butanediol to a concentration of 10% by weight, and was continuously added to the first polycondensation reactor. The flow rate was adjusted so that an amount of the tetra-n-butyl titanate used was 0.3 g ($8.815 \times 10^{-4}$ mol) per 0.52 mols of the adipic acid.

A level (which is a charging quantity in the reactor) of the reaction mixture was adjusted so that the residence time of the reaction mixture in the reactor was 2 hours.

The acid value of the reaction product was 7 mg KOH/g, and the weight average molecular weight was 8,000.

[Second Polycondensation Reaction]

The reaction product of the first polycondensation reaction was continuously added to the second polycondensation reactor to perform the second polycondensation reaction thereof. Here, the flow rate was 35 kg/h, the reaction temperature was 240° C., and the degree of vacuum was 6 torr. Also, a level (which is a charging quantity in the reactor) of the reaction mixture was adjusted so that the residence time of the reaction mixture was 2 hours. As the second polycondensation reactor, the horizontal-type reactor (manufactured by Hitachi Plant Technology) equipped with the single stirrer that is horizontally arranged was used. The acid value of the reaction product was 5 mg KOH/g and the weight average molecular weight was 70,000.

[Third Polycondensation Reaction]

The reaction product of the second polycondensation reaction was continuously added to the third polycondensation reactor to perform the third polycondensation reaction thereof. Here, the flow rate was 35 kg/h, the reaction temperature was 240° C., and the degree of vacuum was 1 torr.

As the third polycondensation reactor, the horizontal-type reactor (manufactured by Hitachi Plant Technology) equipped with two stirrers that are horizontally arranged was used.

A level (which is a charging quantity in the reactor) of the reaction mixture was adjusted so that the residence time of the reaction mixture in the third polycondensation reactor was 1.5 hours.

The final polymer after completion of the third polycondensation reaction was cooled down by being passed through the cooling water bath, and solidified. Then, the final polymer was cut by the cutter and dried to obtain poly(butylene adipate-co-terephthalate (PBAT) including the repeat unit of 1,4-butylene-adipate and another repeat unit of 1,4-butylene terephthalate which is the desired biodegradable polyester copolymer.

The acid value of the PBAT was 2.5 mg KOH/g, and the weight average molecular weight was 150,000.

As the first esterification reactor, the second esterification reactor, the first polycondensation reactor, the second polycondensation reactor, and the third polycondensation reactor in Examples 2 to 5 below, the same reactor as used in Example 1 was used.

Example 2: Preparation of Biodegradable PBAT

[First Esterification Reaction]

1,4-butanediol and adipic acid were added at a molar ratio of 1.3:0.52 to a batch reactor, and the esterification reaction was performed at a temperature of 180° C. under normal pressure. Then, bishydroxy butylene adipate (hereinafter, referred to as BHBA) was obtained and stored in the storage tank.

Water produced by the esterification reaction was removed through the condenser, and triphenyl phosphate and tetra-n-butyl titanate were continuously added to the batch reactor for the esterification reaction the 1,4-butanediol with the adipic acid. The triphenyl phosphate and the tetra-n-butyl titanate were each pre-mixed with the 1,4-butanediol to a concentration of 10% by weight, and were continuously added to the batch reactor. The amount of the triphenyl phosphate and tetra-n-butyl titanate was about 0.1 g and about 0.3 g per 0.52 mol of the adipic acid, respectively.

The acid value of the reaction product was about 1 mg KOH/g, and the weight average molecular weight was 700.

The BHBA prepared in the batch reactor was mixed with terephthalic acid in the first slurry tank to prepare a slurry. The terephthalic acid was quantified in a hopper, added to the first slurry tank, and then stirred while maintaining a temperature in the range of 70 to 80° C. Here, a molar ratio of 1,4-butanediol:adipic acid:terephthalic acid was adjusted to be 1.3:0.52:0.48.

A slurry prepared in the first slurry tank was continuously flowed to the second slurry tank, and the temperature of the second slurry tank was maintained at about 75° C.

[Second Esterification]

The slurry prepared in the second slurry tank was continuously added to the second esterification reactor to react BHBA with terephthalic acid. Here, the flow rate of the slurry was 40 kg/h, the reaction temperature was 230° C., and the pressure was normal.

Water generated by esterification reaction and the THF generated by the side reaction of 1,4-butanediol were removed through the condenser. Pure 1,4-butanediol was continuously added to the second esterification reactor through the injection device at a flowrate of 2.5 kg/h to perform a reaction. A level (which is a charging quantity in the reactor) of the reaction mixture was adjusted so that the residence time of the reaction mixture in the second esterification reactor was 3.5 hours.

The acid value of the reaction products obtained from the second esterification reaction was about 20 mg KOH/g, and the weight average molecular weight was about 2,000.

[First Polycondensation Reaction]

The product obtained by the second esterification reaction was continuously added to the first polycondensation reactor to perform the first polycondensation (referred to as a pre-polymerization) thereof. Here, the flow rate of the product was 35 kg/h, the reaction temperature was 240° C., and the degree of vacuum was 20 torr.

In an additional injection device, tetra-n-butyl titanate was pre-mixed with 1,4-butanediol to a concentration of 10% by weight, and the mixture was continuously added to the first polycondensation reactor at a flow rate of 0.84 kg/h. A level of the reaction mixture was adjusted so that the residence time of the reaction mixture in the first polycondensation reactor was 2 hours.

The acid value of the reaction product obtained by the first polycondensation reaction was about 7 mg KOH/g, and the weight average molecular weight was about 8,200.

[Second Polycondensation Reaction]

The pre-polymer obtained by the reaction in the first polycondensation reactor was continuously added to the second polycondensation reactor to perform the second polycondensation reaction thereof. Here, the flow rate of the pre-polymer was 35 kg/h, the reaction temperature was 240° C., and the degree of vacuum was 6 torr.

A level (which is a charging quantity in the reactor) of the reaction mixture was adjusted so that the residence time of the reaction mixture in the second polycondensation reactor was 2 hours.

The acid value of the reaction product obtained by the second polycondensation reaction was 4.2 mg KOH/g and the weight average molecular weight was 65,000.

[Third Polycondensation Reaction]

The product obtained by the reaction in the second polycondensation reactor was continuously added to the third polycondensation reactor to perform the third polycondensation reaction thereof. Here, the flow rate of the product was 35 kg/h, the reaction temperature was 240° C., and the degree of vacuum was about 1 torr.

A level (which is a charging quantity in the reactor) of the reaction mixture was adjusted so that the residence time of the reaction mixture in the third polycondensation reactor was 1.5 hours. The final polymer after completion of the reaction was cooled down by being passed through a cooling water bath, and solidified. Then, the final polymer was cut by a cutter and dried to obtain biodegradable polybutylene adipate-co-terephthalate (PBAT).

The acid value of the PBAT was 2.7 mg KOH/g and the weight average molecular weight was 148,000.

Example 3: Preparation of Biodegradable PBAT

[First Slurry Tank]

1,4-butanediol, adipic acid, and terephthalic acid were added at a molar ratio of 1.3:0.52:0.48 to the first slurry tank, stirred and mixed together at a temperature of 60° C. to prepare a slurry.

[First Esterification]

The slurry prepared in the first slurry tank was continuously added to the first esterification reactor to perform esterification reaction. Here, the flow rate of the slurry was 48 kg/h, the reaction temperature was 180 t, and the pressure was normal.

Triphenyl phosphate and tetra-n-butyl titanate were added to the reaction mixture of the first esterification reactor to perform esterification reaction.

The triphenyl phosphate and the tetra-n-butyl titanate were pre-mixed with 1,4-butanediol to each have a concentration of 10% by weight, and were continuously added to the first esterification reactor. The flow rate of the reaction mixture was adjusted so that an amount of the tetra-n-butyl titanate used was 0.1 g ($2.94 \times 10^{-4}$ mol) per 0.52 mol of the adipic acid and an amount of the triphenyl phosphate used was 0.3 g ($9.195 \times 10^{-4}$ mol) per 0.52 mol of the adipic acid.

Water produced by the esterification reaction was removed through the condenser.

[Second Esterification Reaction]

The reaction product obtained by the first esterification reaction was continuously added to the second esterification reactor to react the product of the first esterification reaction with the terephthalic acid. Here, the flow rate of the reaction product was 40 kg/h, the reaction temperature was 230° C., and the pressure was normal.

Water produced by the second esterification reaction was removed through the condenser. Pure 1,4-butanediol was continuously added to the second esterification reactor at a flowrate of 2.5 kg/h to perform a reaction. A level (which is a charging quantity in the reactor) of the reaction mixture was adjusted so that the residence time of the reaction mixture in the second esterification reactor was 3.5 hours.

The first polycondensation reaction, the second polycondensation reaction, and the third polycondensation reaction were performed in the same manner as Example 1 to obtain the desirable PBAT, which is a biodegradable polyester.

The acid value of the PBAT was 2.1 mg KOH/g and the weight average molecular weight was 160,000.

Example 4: Preparation of Biodegradable PBAT

The PBAT, which is a biodegradable polyester, was obtained in the same manner as Example 1, except that the first esterification reaction was performed at a temperature of 160° C. Here, a level (which is a charging quantity in the reactor) of the reaction mixture was adjusted so that the residence time of the reaction mixture in the first esterification reactor was 6 hours.

Example 5: Preparation of Biodegradable PBAT

The PBAT, which is a biodegradable polyester, was obtained in the same manner as Example 1, except that the first esterification reaction was performed at a temperature of 185° C. Here, a level (which is a charging quantity in the reactor) of the reaction mixture was adjusted so that the residence time of the reaction mixture in the first esterification reactor was 2.5 hours.

Evaluation Example 1: Comparison of Amount of 1,4-Butanediol with that of Dicarboxylic Acid In regard to the preparation method of biodegradable PBAT according to Example 1 to 3, the amounts of 1,4-butanediol used in the preparation method were compared and are shown in Table 1 below.

TABLE 1

| Division | Moles of 1,4-butanediol based on 1 mol of dicarboxylic acid (mol) |
|---|---|
| Example 1 | 1.45 |
| Example 2 | 1.48 |

TABLE 1-continued

| Division | Moles of 1,4-butanediol based on 1 mol of dicarboxylic acid (mol) |
|---|---|
| Example 3 | 1.48 |
| Comparative Example 1* | 2.18 |

*Comparative Example 1 is provided for comparison with Examples 1 to 3, and calculated based on the molar ratio described in Example 1 of KR 10-2011-007186.

When the ester was prepared according to Examples 1 to 3 above, the amount of 1,4-butanediol used was found out to be reduced compared to that of Comparative Example 1. Thus, according to Examples 1 to 3, the reaction in which 1,4-butanediol was converted to tetrahydrofuran when the esterification reaction was found to be inhibited.

Evaluation Example 2: Comparison of Generation Amount of THF

During the second esterification reaction of Examples 1 to 5, the generation amount of THF was measured based on 1 mol of the dicarboxylic acid (which is the total amount of the adipic acid and the terephthalic acid), and the results are shown in Table 2 below.

TABLE 2

| Division | Generation amount of THF based on 1 mol of dicarboxylic acid (mol) |
|---|---|
| Example 1 | 0.17 |
| Example 2 | 0.22 |
| Example 3 | 0.18 |
| Example 4 | 0.15 |
| Example 5 | 0.25 |
| Comparative Example 2* | 1.09 |

*Comparative Example 2 is provided for comparison with Examples 1 to 5, wherein an esterification reaction was performed in a 3-necked glass flask under the conditions having the same molar ratio of monomer and reaction temperature as those in Example 1 in KR 10-2011-007186, and then the amount of THF generated after esterification reaction was measured.

As shown in Table 2 above, according to the preparation methods in Examples 1 to 5, the generation amounts of the THF were found to be significantly decreased compared to that of Comparative Example 2.

According to the embodiments, the side reaction of 1,4-butanediol is inhibited as described above, and accordingly the amount of 1,4-butanediol used is reduced compared to the conventional method so that the amount of 1,4-butanediol further added during the process is significantly reduced. Thus, manufacturing costs of the biodegradable aliphatic/aromatic polyester copolymer are reduced. Also, the emission amount of the THF is reduced, which is beneficial in terms of environmental protection. Therefore, the biodegradable aliphatic polyester is continuously prepared, thereby enabling mass production thereof.

While the inventive concept has been particularly shown and described with reference to exemplary embodiments thereof, it will be understood that various changes in form and details may be made therein without departing from the spirit and scope of the following claims.

The invention claimed is:

1. A method of continuously preparing a biodegradable aliphatic/aromatic polyester copolymer, the method comprising:

performing a first esterification reaction of an aliphatic dihydroxy compound with an aliphatic dicarboxylic acid at a temperature of 185° C. or less;

continuously performing a second esterification reaction of a reaction product obtained from the first esterification reaction;

obtaining a prepolymer by continuously performing a first polycondensation reaction of a product obtained from the second esterification reaction; and continuously performing polycondensation reaction of the prepolymer, wherein an aromatic carboxylic acid is added to the step of performing the first esterification reaction or the step of continuously performing the second esterification reaction to prepare the biodegradable aliphatic/aromatic polyester copolymer.

2. The method of claim 1, wherein the first esterification reaction is performed at a temperature in a range of about 160 to about 185° C.

3. The method of claim 1, wherein the second esterification reaction is performed at a temperature in a range of about 220 to about 250° C.

4. The method of claim 1, wherein an amount of the aliphatic dihydroxy compound is in a range of about 1.1 to about 1.5 moles based on 1 mole of a total sum of the aliphatic dicarboxylic acid and the aromatic dicarboxylic acid.

5. The method of claim 1, wherein the step of continuously performing the polycondensation of the prepolymer comprises:

continuously performing a second polycondensation reaction of the prepolymer; and continuously performing a third polycondensation reaction of a reaction product obtained from the second polycondensation reaction.

6. The method of claim 5, wherein the second polycondensation reaction is performed under conditions of a temperature in a range of 220 to about 250° C., a degree of vacuum in a range of 2 to about 7 torr, and a residence time of a reaction mixture in a range of 1 to 4 hours.

7. The method of claim 5, wherein the third polycondensation reaction is performed under conditions of a temperature in a range of 220 to about 250° C., a degree of vacuum in a range of 0.5 to about 2 torr, and a residence time of a reaction mixture in a range of 1 to 3 hours.

8. The method of claim 1, wherein the first polycondensation reaction is performed under the conditions of a temperature in a range of 220 to about 250° C., a degree of vacuum in a range of 10 to about 30 torr, and a residence time of a reaction mixture in a range of 1 to 4 hours.

9. The method of claim 1, wherein the first esterification reaction is performed in a batch reactor or continuously performed in an esterification reactor.

10. The method of claim 1, wherein at least one selected from a catalyst, a heat stabilizer, a branching agent, a color stabilizing agent, and a color control agent is further added to a reactor in which the first esterification reaction of the aliphatic dihydroxy compound and the aliphatic dicarboxylic acid is performed.

11. The method of claim 1, wherein a catalyst is further added to a reactor in which the first polycondensation reaction is performed.

12. The method of claim 1, wherein the aliphatic dihydroxy compound comprises at least one selected from a group consisting of ethanediol, 1,2-propanediol, 1,3-propanediol, 1,2-butanediol, 1,4-butanediol, 1,5-pentanediol, 1,6-hexanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, and a mixture thereof;

the aliphatic dicarboxylic acid comprises at least one selected from a group consisting of malonic acid, succinic acid, glutaric acid, 2-methylglutaric acid, 3-methylglutaric acid, adipic acid, pimellic acid, suberic acid, azelaic acid, sebacic acid, undecanedioic, dodecanedioic acid, brassylic acid, tetradecanedioic acid, fumaric acid, 2,2-dimethylglutaric acid, maleic acid, itaconic acid, 2,5-norbornene dicarboxylic acid, and a mixture thereof; and the aromatic dicarboxylic acid comprises at least one selected from a group consisting of terephthalic acid, isophthalic acid, 2,6-naphthoic acid, 1,5-naphthoic acid, and a mixture thereof.

* * * * *